United States Patent [19]
Murphy

[11] Patent Number: 5,305,195
[45] Date of Patent: Apr. 19, 1994

[54] INTERACTIVE ADVERTISING SYSTEM FOR ON-LINE TERMINALS

[75] Inventor: Arthur J. Murphy, Northridge, Calif.

[73] Assignee: Gerald Singer, Torrance, Calif.; a part interest

[21] Appl. No.: 856,250

[22] Filed: Mar. 25, 1992

[51] Int. Cl.$^5$ .............................................. G06F 15/21
[52] U.S. Cl. ..................................... 364/401; 235/375
[58] Field of Search ............... 364/400, 401, 402, 405, 364/407, 410; 235/375, 381, 380

[56] References Cited

U.S. PATENT DOCUMENTS

| Re. 32,115 | 4/1986 | Lockwood et al. | 235/381 |
|---|---|---|---|
| 4,672,554 | 6/1987 | Ogaki | 364/410 |
| 4,973,952 | 11/1990 | Malec et al. | 364/400 |
| 5,091,713 | 2/1992 | Horne et al. | 235/381 |

FOREIGN PATENT DOCUMENTS

| 57-3167 | 1/1982 | Japan . |
|---|---|---|
| 3-204259 | 9/1991 | Japan . |

OTHER PUBLICATIONS

"The Handbook", Prodigy Interactive Personal Service, pp. 2-5 and 5-1 to 5-4, 1990.

Primary Examiner—Robert A. Weinhardt
Attorney, Agent, or Firm—Singer & Singer

[57] ABSTRACT

There is disclosed a new system for providing advertising information into an interactive system having a plurality of remotely located terminals. Each terminal includes a video display unit, logic and a video storage medium such as a hard disc in addition to the normal functions of the interactive system of which an ATM is an example. A remote centrally located commercial computer capable of transmitting digitized signals representing commercial offerings and compressed digitized video signals for display on the video unit communicates with each of the remotely located terminals. The compressed digitized video signals are stored on the hard disc of each terminal for display on the video unit at times determined by the use of the terminal. The user selects the services or goods offered by the terminal in the conventional manner. During the waiting time inherent in the operation of the terminal a high quality video advertising message is displayed on the video unit from the hard disc. The message will last for less then 15 seconds and the user selected function will continue at the conclusion of the message. The advertising message will be changed, updated and varied directly from the central computer.

24 Claims, 3 Drawing Sheets

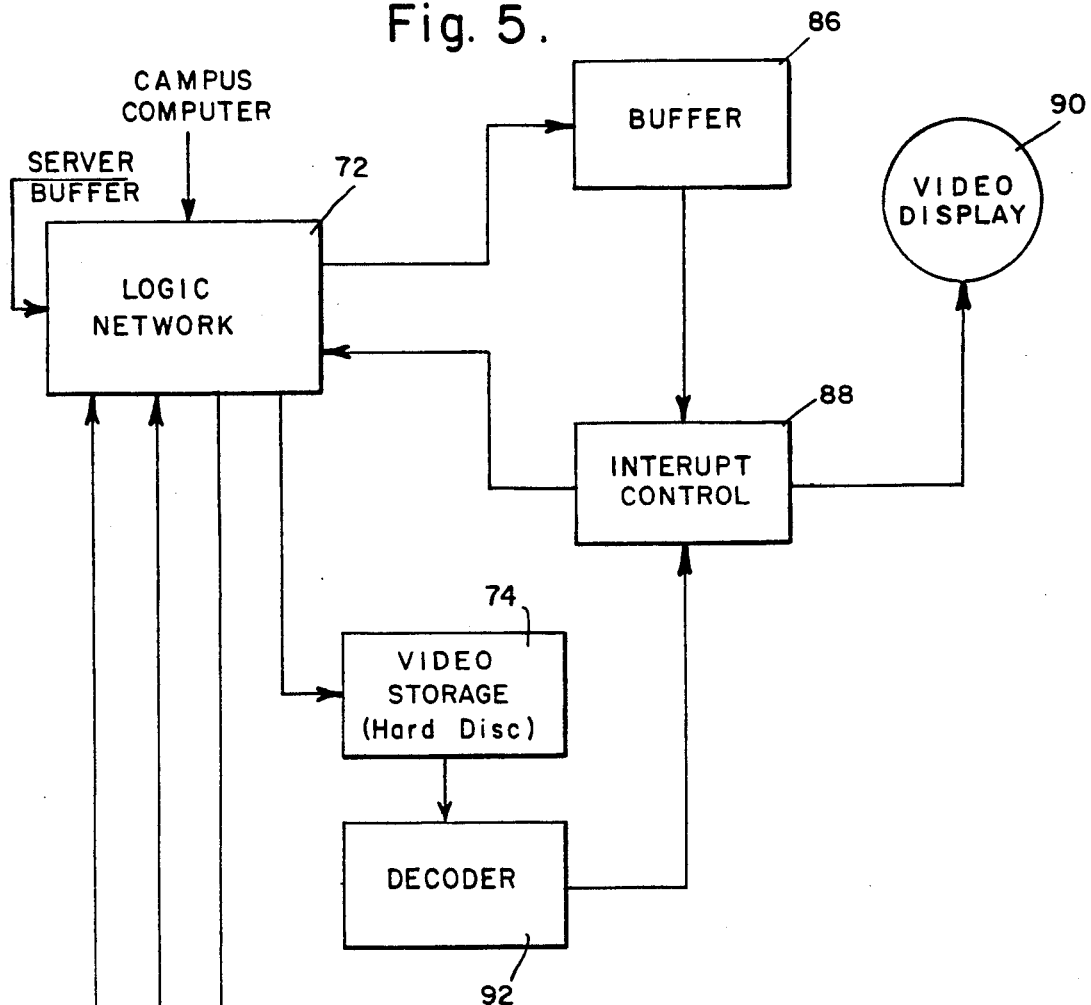
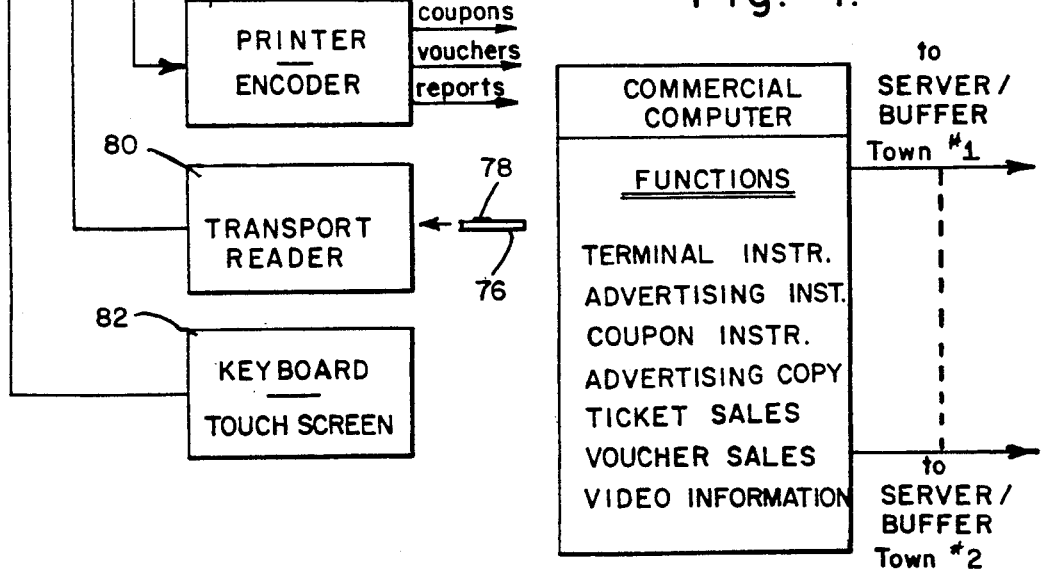

INTERACTIVE ADVERTISING SYSTEM FOR ON-LINE TERMINALS

This invention describes a system for imposing an advertising message on users of remote terminals associated with on-line terminals and more specifically for displaying an advertising message in high quality video on cathode ray tubes located in the terminal itself and without interruption of the service rendered by the terminal.

In this system, use is made of the fact that all tasks take time even with the fastest computer on line. This is a natural fact when it is considered that hundreds if not thousands of terminals are inputting the main line computer for services and information. Invariably, the information or services requested by the user is delayed with a message that states, "working", "please wait" or a pleasant "one moment please". Sometimes a light will flash to indicate the machine is "working".

The present system uses the waiting period normally associated with all on-line terminals to send a high quality video advertising message to a ready willing and waiting consumer.

A review of the conventional automatic teller machines (ATM) in use to day will show a system having a card transport mechanism for accepting a credit card having a magnetic stripe and a key board for use by the user to input an identifying PIN number. Once this information is inputted to the system, the mainframe bank computer identifies the user, and allows the user to select from a variety of services or goods being offered at the terminal. The system also includes a printer for issuing a receipt document.

In the practice of the present invention, a video display unit such as a cathode ray tube, associated logic and a video recording medium such as a hard disc of the type associated with a conventional PC computer is added to the remote terminal. The addition of the video display allows the user to view a high quality visual advertising message in addition to obtaining the goods and services from the terminal.

A commercial computer communicates with each of the remotely located terminals and is capable of delivering updated video advertising message from a sponsor for transmission to each of the terminals for display on the video display unit. The display of the message at the terminal is coordinated at the ATM or terminal device being used so that the message is displayed only during the waiting or not sending time of the mainframe computer driving the ATM or other terminal.

The commercial computer has exclusive control of the advertising message sent to the terminals and is also capable of offering other services which will be explained in connection with the preferred embodiment.

The advertisers are extremely pleased with the concept of being able to present an advertising message in high-definition, full color, full motion video directly to the user at the terminal. The person located at the terminal is a consumer, has the ability to buy and pay for services. The demographics of the consumer are perfect; all of the individual components comprising the system are within the state of the art, and the overall concept of the as defined by the appended claims is nowhere shown or described in the art today.

The system described above would require dedicated co-axial lines between the remote commercial computer and each of the terminals in order to handle the wide bandwith requirement of the video signal being sent to each of the terminals. The interaction between the operation of the terminal and the display of the video message during the waiting time is handled at the terminal itself. Unfortunately, the present day costs of such lines makes the per unit cost of delivering a video advertising message to the consumer at each of the terminals economically not viable.

In the preferred embodiment of the defined system, there is described a system in which digitized video signals are transmitted over telephone lines using compressed video techniques of the same type used in telecommunication systems today. A server communicates directly with the commercial computer and is adapted to feed many terminals, all located in a given area. Additional servers may be used for other locations having many terminals. The server acts as a buffer between the commercial computer and the terminals it serves and is adapted to communicate between the individual terminals.

Each of the terminals contains the necessary functions to perform the basic operations of supplying goods or services to the user be it an ATM or any other kind of ticket or coupon dispenser. The basic interactive system includes a card transport for accepting and reading the magnetic stripe on a suitable card, a keyboard or touchscreen overlay for communicating with the terminal, a ticket or voucher dispenser and possibly an audio prompting system using synthesized voice techniques.

In addition each terminal will now include a cathode ray tube as a Video display unit and preferably a hard disc for recording magnetic information. The hard disc will store the compressed video information containing the video advertising message received from the associated server. Upon command, the video advertising message will feed a decoder located in each terminal for decoding the compressed video signal before feeding the video signal to the video display unit for viewing by the user.

The terminal will be operated in the conventional manner as determined by the needs of the user. During the waiting time, the video message stored in the hard disc of the terminal will be directed to the decoder and sent to an interrupt control that will display the video message when the unit is not otherwise in use. All control functions of waiting and playing the message are located in the terminal thereby eliminating a multitude of lines back to the commercial computer.

The compressed video signals being transmitted from the commercial computer to each of the servers can be transmitted over telephone lines for storage in the hard disc thereby eliminating the need for dedicated wide bandwith lines such as co-axial lines. In addition, updated video messages can be transmitted at low speeds during low phone use when the terminals are typically not being used thereby allowing the servers to have the latest advertising messages for storage and display.

It will be appreciated by those skilled in the art that once the commercial computer is tied into the individual terminal, that additional services other than delivering a video message can now be achieved. Merchandising and the sale of all items is now possible including the ability to select and order, through the keyboard, and to pay for the items selected, through the use of credit cards. In addition, coupons, tickets and promotional items can be offered and dispensed. There is no limit to the use of this new sales tool.

In considering the best mode of operation, the invention will be described in connection with the defined system being used in connection with a college town having a college with at least 25,000 students. It is quite obvious that a college of that size must use a mainframe computer to control the listing of students, instructors, classes, grades, registration, course screening, campus activity, payment and the general operation of the school.

For proper service to the students, at least one hundred terminals will be located on campus. Each terminal communicates directly with the college mainframe computer and can be accessed directly once the student inserts his card containing the magnetic stripe and his PIN number.

In the typical school registration system, a student is first interviewed by an advisor and approved for registration within certain guidelines. Depending upon the sophistication of the system, the student is issued an approval slip, usually in the form of a card with a magnetic strip that identifies the student and his approval. Usually a special identification number uniquely identifying the student is established and assigned to the student. This number which uniquely identifies the student is then encoded on the stripe of the students card and usually printed on all documents issued to the student user.

The student selects an appropriate terminal, inserts his card and PIN number and is ready to access the school mainframe to complete his registration. Once the student is properly identified by the campus mainframe, all available options are available and they include by way of example, class selection, residence selection, book selection, course screening, grades, campus information, scholarships/student loans, jobs/work study, classified ads and even payment capability are including together with any other information that the school feels the student should have access to in order for him to complete his registration.

A complete printout of his schedule is available on the video screen for review. Each terminal is capable of laser printing in both letter size and strip format thereby giving the student a printed record of all requested information be it school requested information or commercial information such as tickets, vouchers or coupons.

The commercial computer is located remotely to the campus and is capable of serving a plurality of different campuses throughout the country by means of telephone lines. In the preferred embodiment the commercial computer is connected by phone lines directly to a server or a plurality of servers each located on campus. The server in turn is connected by dedicated lines with each terminal and is adapted to feed the compressed digital video information to the hard disc associated with each terminal.

The terminal is programmed to deliver a selected video advertising message from the hard disc to the decoder for display on the video display unit during the waiting time associated with the terminal while the school computer searches for the requested information. The selection of the advertising message is determined by the message recorded on the hard disc. A selection of different messages are recorded and updated periodically and regularly over the telephone lines under the control of the commercial computer.

Further objection and advantages will be described by referring now to the accompanying drawings wherein:

FIG. 4 is a block diagram of a commercial computer listing the different services being offered to the various server/buffers located in the different college towns; and FIG. 5 is a block diagram of a dual input interactive terminal.

The basic system to be described concerns an advertiser supported audio/video interactive terminal system to be deployed on an average collage campus across the country. Students will use the terminals for all necessary school functions such as student elections, degree audits, sports facility scheduling, campus tours, grade reporting, payment of all types of fees, registration and class selection just to name a few.

Advertisers will sponsor each student's use of the terminal by providing a changeable high quality video message for display on a video display unit associated with each terminal. Special commercial offerings, such as tickets, sales vouchers and coupons will be offered to the students when the terminals are used.

Figure 1:
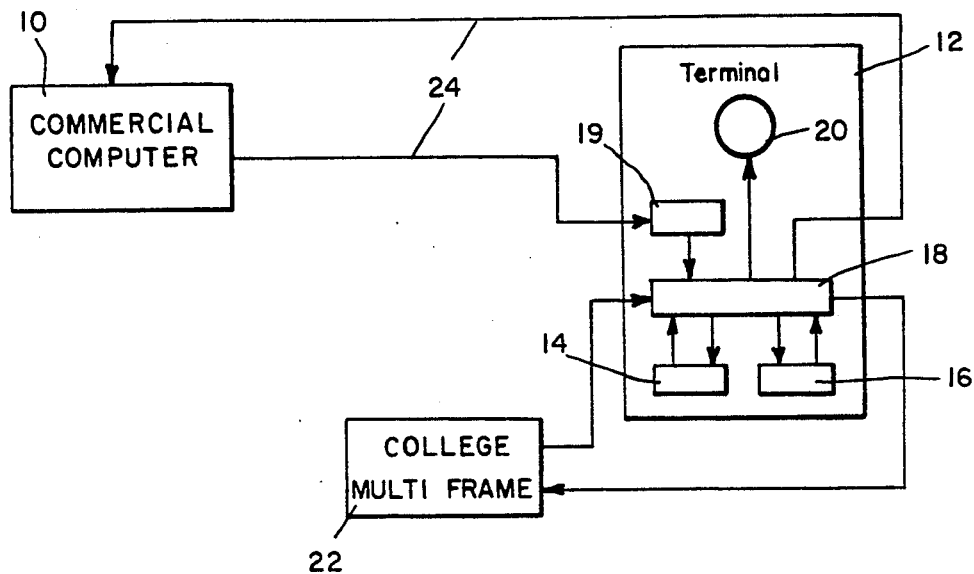
FIG. 1 is a block diagram of a single commercial computer and college mainframe computer feeding a single on-campus terminal.

Referring now to FIG. 1 there is shown a remotely located commercial computer 10 capable of feeding video and digital information to a remotely located terminal 12 located on campus and accessible to students. The terminal 12 contains all the necessary functions of a terminal which includes a card transport mechanism 14, a printing device 16, a hard disc 18 including associated logic controls and a video display unit 20. A stand alone college mainframe computer 22 containing all the information associated with the college also feeds the terminal 12.

The disclosed system is technically viable only if the long lines 24 feeding the commercial computer 10 with the terminal 12 have the necessary bandwidth to handle the video signals for display on the video display 20 on the terminal. In addition the long lines 24 have to be dedicated lines such as coaxial lines interconnecting each terminal 12 with the commercial mainframe.

A college campus of 25,000 students would require about 100 terminals by assuming one terminal for 250 students. The number of dedicated lines needed is to insure the quality of the video display at the terminals. The offering of the video display is determined by the operating parameters of the terminal and is offered during the normal waiting period when the college mainframe 22 is seeking information that was requested by the student.

In the usual terminal system, a signal is given during the waiting time that the computer is, "working", "holding", "searching" or even a simple, "one moment please" signal is displayed. In the disclosed system a 15 second high quality video signal containing an advertising message is displayed on the video display unit 20 together with an appropriate high quality audio message. The advantages to the advertiser of being able to deliver a high quality video display message to the ultimate user at the terminal can not be overstated.

The inventive concept has been described broadly in connection with FIG. 1 using dedicated coaxial lines to obtain the necessary band width for the high definition Video display. Unfortunately, the need for the wide bandwidth dedicated long lines 24 between the commercial computer 10 and the terminal 12 limits the defined system and does not represent the best mode of operation.

Figure 2:
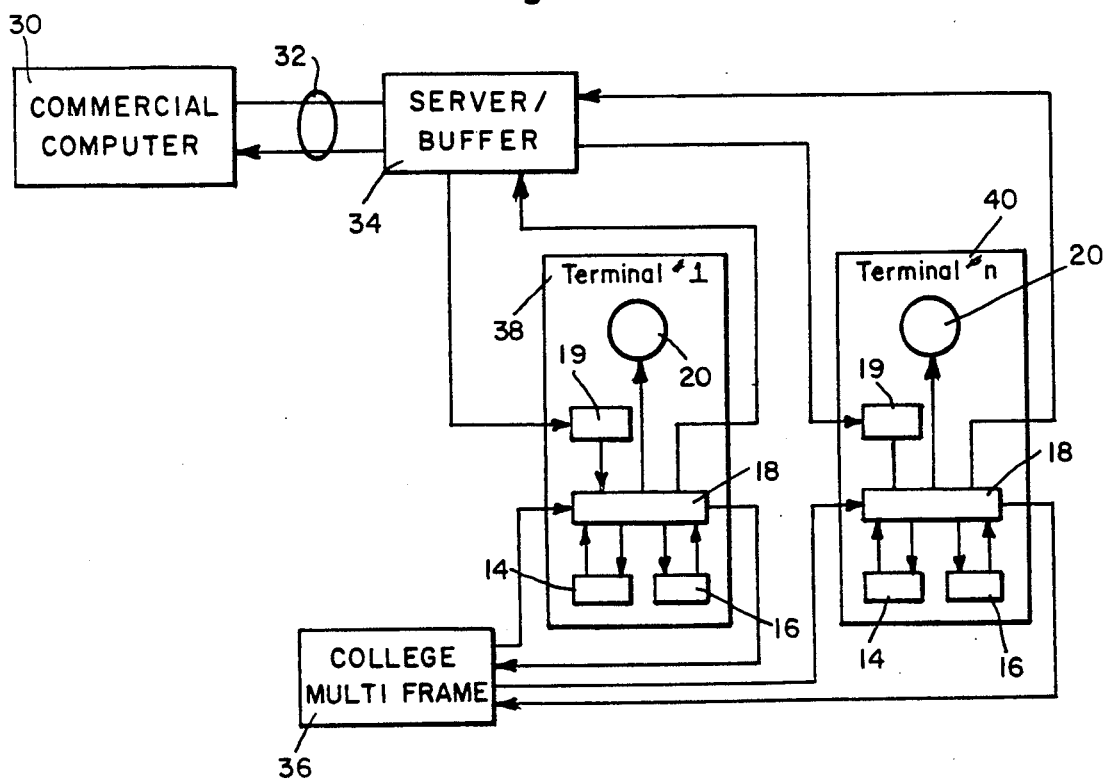
FIG. 2 is a block diagram of a remote commercial computer feeding a pair of local terminals through a server/buffer located in close proximity to the terminals.

The preferred embodiment which is now illustrated in FIG. 2 illustrates a remotely located commercial computer 30 connected by means of telephone lines 32 to server/buffer 34 located in the same town as the college mainframe 36. The server/buffer 34 feeds a plurality of terminals such as terminals 38 and 40 which are similar to terminal 12 illustrated in FIG. 1. The college mainframe 36 is directly connected to each of the locale terminals 38 and 40.

All information from the commercial computer 30 is sent in digital form to the server/buffer 34. All video information is transmitted by means of compressed digitized signals for distribution to each of the terminals 38 and 40 for storage on the hard disc associated with each terminal.

By utilizing compressed digital video signal it is now possible to eliminate the need for dedicated coaxial wide bandwith lines from the commercial computer 30 to the individual terminals. It is now possible to use conventional dial-up telephone lines 32 which is more readily available. Dial-up telephone lines are presently being used in the videoconferencing telcomunication field where compressed digital signals are transmitted over phone lines from transmitter to receiver where the received video signals are displayed. The key to an economical video transmission system is the ability to digitize the video signal and compress the data so it can be more economically transmitted over existing lines and-stored at the terminal.

A compatible expander or decoder must of course be located at each of the terminals 38 and 40 located at the receiving end to reassemble the signal for viewing. For any system to be successful it is necessary for the signal expander and compressor at the transmitter site and the receiver site be compatible as to coding, display format and transmission speed.

Present day coding and decoding devices termed codecs, are made by such companies as Compression Labs, Inc. which makes a compression-expansion device. The term codec is a generic term referring to any coder-decoder device. Other companies making a codec are NEC in Japan, GPT VideoSystems, Ltd, in the United Kingdom, and some other small companies in the United States. Because each company uses different coding and transmission speeds it is necessary for any given system to use the same coder and decoder at the transmitter and receiver site.

The codec is a sophisticated black box that makes digital video transmission possible on switched digital telephone lines and private digital networks. The codec takes any incoming analog signal such as voice, video (television signal), freeze frame video, and digital signals such as FAX or personal computer programs and converts these signals to digital form. The digital signals are compressed to a size that reduces the transmission time from approximately 90 million bits per second (without compression) to as little as 56,000 bits per second (with compression). This mix of various signals is then sent over regular telephone lines using existing telecommunication technology and protocols. A receiving codec at the receiving server/buffer 34 reverses the process by expanding the digitized signals thereby making full motion, real time video display possible.

The compression technology for each company making a compressor and expander utilizes proprietary mathematical algorithms. Under the auspices of the Consultative Committee on International Telephony and Telegraphy (CCITT) a single standard for video compression for video codecs communication from 2.048 mbps, and 64 kbps has been established. This standard will provide for complete operability between video codecs and video phones worldwide. The interoperability would be similar to that existing for facimile machines today. The new standard is being referred to as "PX64". The advent of the compression standard will allow different codecs to communicate with each other regardless of the manufacture thereby making telecommunication more accessible to all.

Over the last couple of years, motion video at low data rates has improved by two means:

(1) use of new image compression technology, and
(2) the ability to operate on two 56-kbps circuits simultaneously like a single 112 kbps circuit.

The ability to operate at a higher data rate of 112 kbps together with improved image compression techniques, now allow good quality video to be delivered on 56 kbps circuits. In addition, the local telephone companies are now offering local switched 56 service nationwide.

Switched 56 service offers dial up convenience without going to a special conference net thereby allowing video transmission to be spontaneously dialed up like ordinary telephone calls.

The server/bufer 34 receives all digitally transmitted signals and redirects them to the associated terminal 38 or 40 for storage on the hard disc 18 associated with each terminal. On command as determined by the use of the individual terminal 38 or, 40, the recorded video commercial message stored on the hard disc 18 is fed to the decoder 19 to allow the stored video message to be visually displayed on the video display unit 20 on the terminal during a holding or waiting period as determined by the use of the terminal itself.

In operation, the server/buffer 34, the college mainframe 36 and all local terminals 38 and 40 will be located in the local college town while the commercial computer 30 will be located remotely communicating with the server/buffer over telephone lines 32.

The college mainframe 36 is completely independent of the commercial computer 30 and separately feeds and is responsive to each of the terminals 38 and 40. Campus users can access information regarding every aspect of campus life, receive printed schedules and forms, input data, and in general carry out many of the routine and time consuming chores of academic life. Payment can be made through the system using either a major credit card or debit card.

Terminals are located throughout the campus in dormitories, student centers, cafeterias, and office and classroom building. Public information may be accessed by anyone, but personal information is restricted, accessible only by ID card and PIN number. Each terminal is fully equipped to handle all functions that the school administration assigns to it, including the printing of hard copy when appropriate. The video display unit 20 is selectively available for displaying information from wither the college mainframe 36 or he commercial computer 30.

Figure 3:
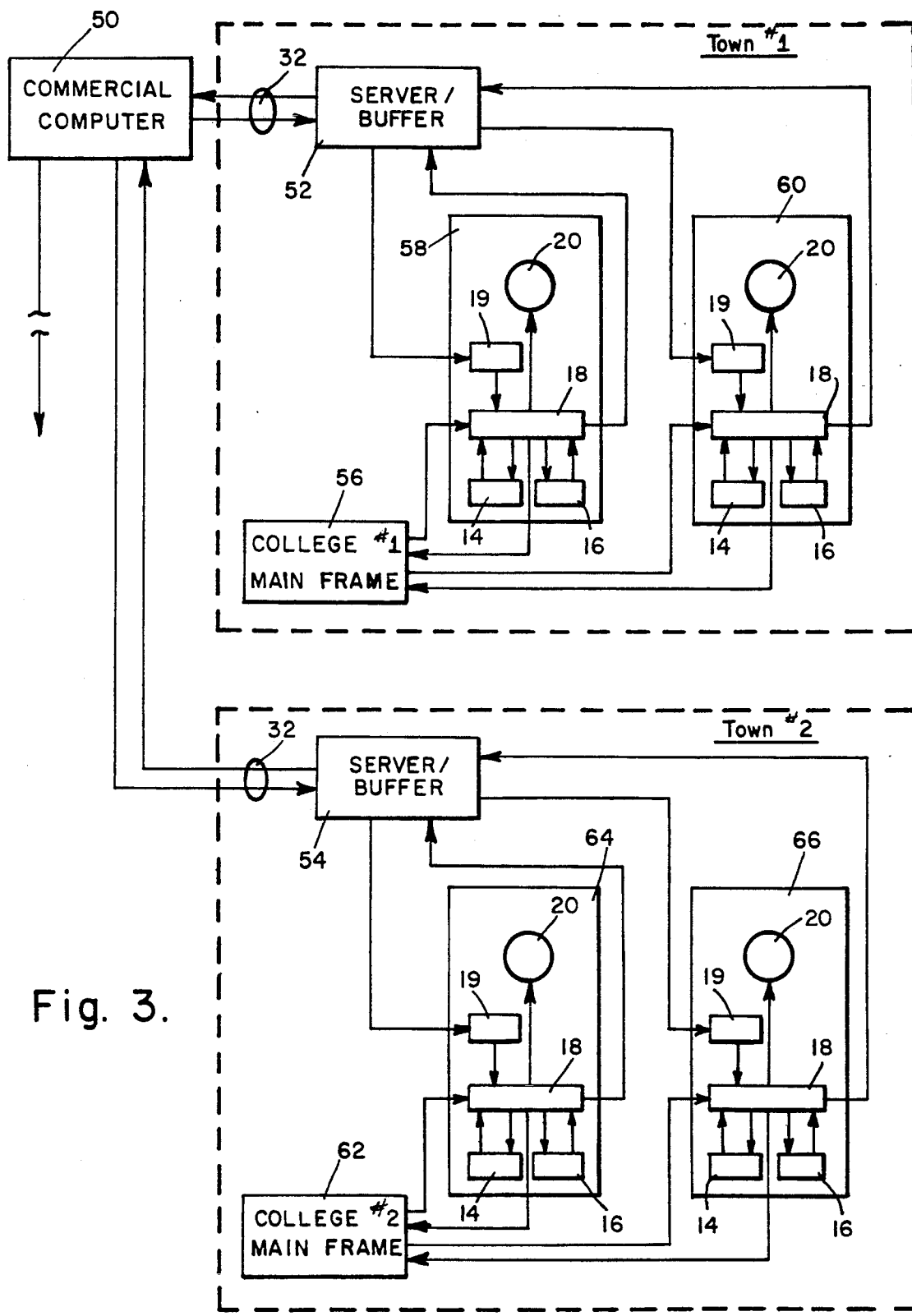
FIG. 3 is a block diagram of a commercial computer feeding different buffer/servers located in separate college towns.

Referring now to FIG. 3 there is shown a block diagram of an advertising system using a single remote commercial computer 50 feeding a plurality of server/buffers 52 and 54 located in different campus towns. Located in town #1 is a college mainframe 56 feeding a plurality of identical terminals 58 and 60. In a similar manner there is located in town #2 a college mainframe 62 feeding a plurality of identical terminals 64 and 66.

Referring now to FIG. 4 there is shown a block diagram illustrating the functions of the commercial commuter. In all cases the commercial computer 10 of FIG. 1 is identical with 30 of FIG. 2 and 50 of FIG. 3. All functions which include terminal instruction, advertising instruction, coupon instruction, advertising copy, ticket sales, voucher sales and video information are transmitted in digital form to the server/buffer associated with each town. As described previously, the individual digitized information is stored on the hard disc associated with each terminal for display on the video display unit associated with each terminal.

Referring now to FIG. 5 there is a block diagram of a dual input interactive terminal 70 of the type illustrated in FIGS. 2 and 3. The terminal is actually a convention terminal of the type used in an ATM today with the addition of a video display unit, a logic unit, a decoder and a hard disc of the type used in any PC. The terminal 70 receives a digital input signal from the commercial computer and the local college mainframe which is fed to a main logic network 72.

The digital input signal from the server/buffer is feed to the logic network 72 which feeds a video storage medium such as a hard disc 74 which stores the received commercial digital signal. By way of example this could include video display information, as well as all of the other commercial information transmitted by the commercial computer and illustrated in FIG. 4.

In operation, a student or user of the terminal will insert his or her card 76 containing a magnetic strip 78 into the card transport reader 80 which communicates the read information to the logic network 72. At the same time the user will input the keyboard 82 with the proper pin number which is fed to the logic network 72 for allowing access to the terminal 70.

At this point in time the user can select from the many options which include commercial offerings and/or school offerings. A printer encoder 84 under the control of the logic network 72 will print selected reports, issue vouchers and or selected coupons.

Selected information will also be feed from the logic network 72 to a buffer through an interrupt control 88 to a video display 90 for viewing by the user. At any point of time that the display is on hold, for any reason, the interrupt control 88 will signal this information to the logic network 72 which will then control the video storage 74 to read out the latest video message stored to a decoder 92 which feeds the video advertising message through the interrupt control to the video display 90 for viewing and display.

During the display of the video message the interrupt control 88 will indicate to the logic network 72 that the video display is in use and that no further information should be sent to the buffer 86 for display. In other words the interrupt control 88 will only allow information from either the logic unit 72 or from the decoder 92 at any given time while at the same time allowing the commercial video message to be display during any waiting or dead time as indicated by the output of the logic network 72.

The functions of the terminal 70 include a keyboard, logic means, hard disc, card reader, printer, computer and touch screen overlay and a video display unit such as a cathode ray tube. The actual display of the video message on the video display unit associated with each terminal comes from the hard disc associated with each terminal. The display of the video advertising message is a function of the use of the terminal itself and the delays inherent in the terminal.

I claim:

1. A system for inputting and accessing information comprising:

a terminal comprising in part a video display unit for storing and displaying full motion video sequences;

means remote to said terminal for imputting changeable full motion video sequences of advertising information to said video display for storage and display at the terminal;

said terminal connected to other on-line services;

means for selecting desired information offered by said on-line services at the terminal;

printing means for printing the information selected at the terminal on a hard copy in man readable form, means responsive to a delay in displaying the desired information at said terminal for generating an interrupt signal, and means for controlling the display of said stored full motion video sequences of advertising information at said terminal with said interrupt signal.

2. A combination according to claim 1 in which said stored full motion video sequences of advertising information is displayed only after the generation of said interrupt signal.

3. A combination according to claim 1 in which said video display unit is capable of displaying full motion high definition video sequences in full color.

4. A combination according to claim 1 in which said video display unit displays said other on-line services selected by said user.

5. A combination according to claim 1 in which said visual display unit is a cathode ray tube for visually displaying video information.

6. A combination according to claim 1 in which said means for selecting includes a touch screen overlay operated by the user for selecting desired information being offered at the terminal.

7. A combination according to claim 1 in which said means for selecting includes a keyboard operated by the user for accessing the terminal and selecting desired information being offered.

8. A combination according to claim 1 in which said printing means includes means for printing in both letter format and strip format.

9. A combination according to claim 1 in which said printing means includes means for encoding information in machine readable format.

10. A combination according to claim 1 in which all video information transmitted from said remote means for display by said video display unit is transmitted as compressed digitized signals.

11. A combination according to claim 10 in which said terminal includes a video storage medium for storing said compressed digitized video information, and means for decoding said stored video information and displaying said information.

12. A combination according to claim 1 which includes;
a magnetic stripe card reader for reading recorded information on a card to uniquely identify the card holder, and
means responsive to said card reader for generating an access signal for said on-line services.

13. A combination according to claim 12 in which said full motion video sequences of information is advertising information displayed only during a delay in the operation of the terminal.

14. An interactive network system comprising:
a terminal comprising in combination a video display unit, printing means, keying means, and a video storage medium,
said video display unit consisting of a high definition full color display for displaying full motion video sequences,
means for inputting full motion video sequences of information in digitized compressed format for storage in said video storage medium to be displayed on the video display unit,
said terminal connected to a plurality of other on-line services capable of being accessed by the user,
said keying means under the control of a user for selecting desired information offered by the terminal,
said printing means for printing the information selected by the user on a hard copy in man readable form, and
means responsive to a delay in displaying the desired information at the terminal for displaying said recorded information from said video storage medium on said video display unit.

15. A college network interactive advertising system comprising:
a plurality of terminals located on campus each comprising in combination a video display unit, printing means, keying means and a video storage medium;
said video display unit consisting of a high definition full color display for displaying full motion video sequences;
a remotely located external commercial computer for generating a plurality of different full motion video sequences of commercial messages concerning goods and services in digital form and for generating video advertising copy in digitized compressed format,
at least one server located on each campus receiving an input from said commercial computer and connected to each of said terminals on said campus;
said video information in digitized format being stored on said video storage medium located in each terminal for display on the video display unit of each terminal;
at least one single school main frame computer under independent control connected directly to each terminal located on said campus and controlling all school information available to the user;
said keying means under the control of a user for selecting desired information offered by the commercial computer and the school main frame computer;
said printing means for printing the information selected by the user on a hard copy in man readable form, and
means responsive to a delay at the terminal in displaying the information selected for displaying the recorded full motion video sequences of information from said video storage medium for visual display on said video display unit.

16. A combination according to claim 15 in which said changeable video information is advertising copy displayed only during a delay in the operation of the terminal.

17. A combination according to claim 15 in which said visual display unit is a cathode ray tube for visually displaying selected video information and commercially offered information from said external commercial computer.

18. A combination according to claim 17 in which said keying means includes a touch screen overlay operated by the user for selecting desired information being offered.

19. A combination according to claim 15 in which said keying means includes a keyboard operated by the user for selecting campus information and commercial information.

20. A combination according to claim 15 in which said printing means includes means for printing in both letter format and strip format for printing commercial information and campus information.

21. A combination according to claim 15 in which said video storage medium stores compressed digitized video information, and further comprising
decoder means fed by said video storage medium recording means for playing said stored video information on said video display.

22. A combination according to claim 15 which includes;
a magnetic strip card reader for reading recorded information on said card to uniquely identify the card holder,
means responsive to said card reader for generating an authorization control signal, and
said printing means for printing said authorization control signal on all printed information supplied to said user.

23. A system for inputting and accessing information comprising:
a terminal comprising in part a video display unit for displaying full motion video sequences and video recording means;
means remote to said terminal for imputting changeable full motion video sequences of advertising information to said video display unit for recording on said video recording means;
said terminal connected to one or more other on-line services;
means for selecting desired information in real time offered by said on-line services;
printing means for printing the information selected at the terminal on a hard copy in man readable form, and
means responsive to any delay in said on-line services being energized for causing said recorded full motion video sequences of advertising information to be displayed on said video display unit.

24. A method for displaying a full color, full motion video sequences of advertising message at a terminal having video recording and display capability comprising the steps of:

imputting changeable full motion video sequences of advertising information from a remote source to the terminal for recording;
connecting the terminal to at least one other on-line services;
selecting desired information offered by the on-line services at the terminal;

printing the information selected at the terminal on a hard copy in man readable form, and
displaying said recorded full motion video sequences advertising information on the video display unit during any delay in displaying the desired on-line services at the terminal.

* * * * *